US012674500B2

(12) United States Patent
Stjärne

(10) Patent No.: US 12,674,500 B2
(45) Date of Patent: Jul. 7, 2026

(54) VALVE ARRANGEMENT, VALVE DEVICE, SHOCK ABSORBER AND METHOD OF REGULATING PRESSURE IN A FLUID FLOW

(71) Applicant: Advanced Suspension Technology LLC, Northville, MI (US)

(72) Inventor: Björn Stjärne, Jönköping (SE)

(73) Assignee: Advanced Suspension Technology LLC, Northville, MI (US)

( * ) Notice: Subject to any disclaimer, the term of this patent is extended or adjusted under 35 U.S.C. 154(b) by 502 days.

(21) Appl. No.: 18/337,685

(22) Filed: Jun. 20, 2023

(65) Prior Publication Data

US 2024/0003400 A1     Jan. 4, 2024

(30) Foreign Application Priority Data

Jul. 1, 2022    (EP) ..................................... 22182620

(51) Int. Cl.
*F16F 9/34*        (2006.01)
*F16K 31/06*      (2006.01)
(52) U.S. Cl.
CPC ............ *F16F 9/34* (2013.01); *F16K 31/0655* (2013.01); *F16F 2230/24* (2013.01)
(58) Field of Classification Search
CPC .... F16F 9/34; F16F 9/348; F16F 9/465; F16F 2230/24; F16K 31/0655
See application file for complete search history.

(56) References Cited

U.S. PATENT DOCUMENTS

| | | | | | |
|---|---|---|---|---|---|
| 9,151,354 | B2 * | 10/2015 | Ewers | ..................... | F16F 9/464 |
| 12,025,204 | B2 * | 7/2024 | Ewers | ..................... | F16F 9/465 |
| 2014/0008556 | A1 * | 1/2014 | Ewers | ..................... | F16F 9/464 |
| | | | | | 251/69 |

(Continued)

FOREIGN PATENT DOCUMENTS

| | | | | |
|---|---|---|---|---|
| EP | 2492534 A1 | 8/2012 | | |
| EP | 3988816 A1 * | 4/2022 | ............... | F16F 9/48 |

(Continued)

OTHER PUBLICATIONS

Extended Search Report for corresponding European Patent Application No. 22182620.9 dated Jan. 9, 2023.

*Primary Examiner* — Thomas W Irvin
(74) *Attorney, Agent, or Firm* — Harness, Dickey & Pierce, P.L.C.

(57)            ABSTRACT

A valve arrangement regulates a pressure in a hydraulic fluid flow in a valve device in response to an actuating force during an active control operation and mechanically regulates the pressure during a fail-safe operation when no actuating force is present. The valve arrangement comprises a first spring member adapted to be arranged in a valve chamber of the valve device to interact with a valve seat to provide a first restriction by which the hydraulic fluid flow is restricted during active control operation, and a second spring member adapted to be arranged in the valve chamber to provide a second restriction by which the hydraulic fluid flow is restricted during fail-safe operation. During active control operation, an active control flow channel is open. During fail-safe operation, the active control flow channel is substantially closed by means of the first spring member.

16 Claims, 7 Drawing Sheets

(56)                    References Cited

U.S. PATENT DOCUMENTS

| 2019/0323575 | A1 |    | 10/2019 | Mori et al. |         |
|---|---|---|---|---|---|
| 2022/0128116 | A1 | * | 4/2022 | Ewers | F16F 9/464 |
| 2023/0079968 | A1 | * | 3/2023 | Nakano | F16F 9/34 |
|  |  |  |  |  | 188/322.13 |
| 2024/0159289 | A1 | * | 5/2024 | Larsson | F16F 9/3485 |
| 2024/0369124 | A1 | * | 11/2024 | Stjärne | F16K 31/06 |

FOREIGN PATENT DOCUMENTS

| JP | 2017180608 A | 10/2017 |
|---|---|---|
| WO | WO-2009157841 A1 | 12/2009 |

\* cited by examiner

1000a

100

1000b

100a

100b

VALVE ARRANGEMENT, VALVE DEVICE, SHOCK ABSORBER AND METHOD OF REGULATING PRESSURE IN A FLUID FLOW

CROSS-REFERENCE TO RELATED APPLICATION

This application claims the benefit and priority of European Patent Application No. 221826209 filed on Jul. 1, 2022. The entire disclosure of the application referenced above is incorporated herein by reference.

FIELD

The present disclosure generally relates to the field of valve arrangements. More specifically, the present disclosure relates to a valve arrangement for a valve device for electrically regulating a pressure in a fluid flow in the valve device during an active control operation and mechanically regulating said pressure during a fail-safe operation when no actuating force is present. The present disclosure further relates to: a shock absorber comprising such a valve arrangement and valve device and; and a method of controlling fluid flow in a valve device.

BACKGROUND

Electrically controlled hydraulic damper devices may comprise pilot valves electrically actuated by, for example, a solenoid. The pilot valve is used to control a main valve, which in turn adjusts a flow of hydraulic fluid in a shock absorber and thereby the damping characteristics. For instance, control of a main valve may allow adjustment of a flow of hydraulic fluid between working chambers of the shock absorber, i.e., rebound and compression chambers, of the shock absorber and thereby the damping characteristics. Such a shock absorber should preferably be able to handle electrical or mechanical malfunction of the solenoid or the control system without leaving the valves in an open state. Leaving the valves in an open state may result in a substantially unrestricted flow of hydraulic fluid between the damping chambers and consequently a lack of damping force.

There exist shock absorbers involving means for enabling a fail-safe operation in order to handle above mentioned malfunctions. However, one problem of such a solution is that the means for enabling fail-safe operation typically comprises a collection of components which together add non-negligible weight to the hydraulic valve device which in turn affects damping characteristics. Moreover, this typically requires the size of the shock absorber to be increased which is a disadvantage due to the limited space available when arranging hydraulic damper device, such as a shock absorber, to a vehicle. Some solutions may not be compatible with some vehicles.

It is therefore of interest to provide a valve arrangement enabling fail-safe operation that is lighter, requires less space, and enables desirable damping characteristics.

SUMMARY

It is an object of the present disclosure to provide an improved solution that alleviates the mentioned drawbacks with present solutions. In particular, a first object of the disclosure is to provide a valve arrangement for regulating a pressure in a hydraulic fluid flow which valve arrangement can be realized in a smaller form factor, thereby requiring less space in a valve device than prior art solutions which consequently allows the valve device to be made in a smaller form factor. Additional objects of the disclosure are to provide a valve device and a shock absorber, each of which that can be realized in smaller form factor. A further object of the disclosure is to provide a method of regulating a pressure in a hydraulic fluid flow. Advantages of the various aspects of the disclosure and embodiments thereof are discussed in the following.

According to a first aspect of the disclosure, a valve arrangement is provided for regulating a pressure in a hydraulic fluid flow in a valve device in response to an actuating force during an active control operation and for mechanically regulating said pressure during a fail-safe operation when no actuating force is present. The valve arrangement comprises a first spring member adapted to be arranged in a valve chamber of the valve device to be at least partly moveable within the valve chamber in an axial direction to interact with a valve seat to provide a first restriction by which the hydraulic fluid flow is restricted during active control operation. The valve arrangement further comprises a second spring member adapted to be arranged in the valve chamber to provide a second restriction by which the hydraulic fluid flow is restricted during fail-safe operation. The second spring member is further adapted to be arranged in the valve chamber to define a first fluid flow space and a second fluid flow space, and further arranged so that an active control flow channel fluidly connects the first fluid flow space with the second fluid flow space. The valve arrangement is adapted such that during active control operation, the active control flow channel is open, and during fail-safe operation, the active control flow channel is substantially closed by means of the first spring member.

By this, the valve arrangement may define in a compact manner a fluid flow path for hydraulic fluid flow to follow during active control operation and similarly in fail-safe mode. An advantage of this is that it eliminates the necessity of a valve device itself to be adapted in size and shape to define said fluid flow path. In particular, no geometrically defined ports, orifices, or channels must be provided in a valve housing, armature member, or the like, of the valve device into which the valve arrangement is arranged. Therefore, such parts may be provided also in a more compact manner. Such parts may also be manufactured more easily. Less material may be required as well. Due to the compactness of the valve arrangement, a valve device incorporating such a valve arrangement may be realized in a smaller form factor as compared to prior art solutions, thereby solving the first object of the disclosure.

For the purpose of clarifying some terms and wordings used herein, some clarifications are provided in the following.

In the context of this application, by the term "part", it may be meant a separate element. For example, a first feature and a second feature, when referenced as different parts, may be understood as being structurally separate features, either separated in space or arranged together with a distinct boundary therebetween. By the term "portion", it may be meant an area or a region of an element. For example, a first feature and a second feature, when referenced as different portions, may be understood as being different and optionally non-overlapping regions of a single element. By the phrase "at least partly" or "at least partially", it may refer to one or more parts and/or one or more portion of an element. For example, an element at least partly moveable may be understood to have one or more parts or one or more portions that is moveable relative to some other referenced feature.

By fluidly arranged, coupled, or connected or the like, it may be meant that a first feature and a second feature are directly or indirectly connected so as to establish a fluid flow path between the first feature and the second feature, and not that a first feature is floating relative a second feature.

By restricting, it may be meant an act of adjusting the dimensions of a fluid flow opening. The dimensions of the fluid flow opening may be increased or decreased, thereby impacting the hydraulic fluid flow flowing through the fluid flow opening. A restriction may therefore be understood as a dimension-adjustable fluid flow opening. A restriction may be an adjustable space between two or more elements which can be mutually moved relative each other to adjust said adjustable space.

By actuating force, it may be meant a force which can be operatively controlled. The actuating force may be operatively controlled to be applied by means of an actuation device to cause at least some regulation of the hydraulic fluid flow. The actuating force may be applied in a predetermined direction, such as in a direction parallel to a longitudinal axis of the valve arrangement. The magnitude of the actuating force may be operatively adjusted. The actuating device may comprise a solenoid device for generating a magnetic field causing an actuating element to be subjected to said actuating force.

By active control operation, it may be meant a mode of operation during which the actuating device is operatively controlled to provide the actuation force, preferably by electrical means.

By mechanically regulating, it may be meant that the hydraulic fluid flow is regulated by one or more restrictions, each restriction controllable by means of a biasing member for reducing a flow cross section of said restriction.

Additional optional features of the disclosure according to the first aspect is detailed in the following.

The valve arrangement is adapted to be arranged in a valve device. Generally, such a valve device comprises a valve housing defining a valve chamber. The valve housing may be adapted with one opening or a plurality of openings for enabling hydraulic fluid flow into and/or through the valve chamber. Hydraulic fluid may flow into the valve chamber via a main fluid flow opening. The valve device may also comprise a valve seat. The main fluid flow opening may be provided in a valve seat. The valve seat may be provided adjacent to the main fluid flow opening. The valve seat may extend around the main fluid flow opening. The first restriction formed therebetween may restrict the hydraulic fluid flow during active control operation. The valve arrangement may be adapted to be arranged in such a valve chamber and be actuated during active control operation by means of an actuating device to restrict the fluid flow at a first restriction between the valve seat and the first spring member of the valve arrangement. During fail-safe mode, the fluid flow may be mechanically restricted by means of the second spring member.

The valve device may comprise a main valve chamber and a pilot valve chamber. The valve arrangement may be adapted to be arranged in the pilot valve chamber and serve as an element of a pilot valve arrangement.

The valve device may comprise a first valve member and a second valve member. The first valve member may be a valve housing member for receiving a valve body. The valve housing member and the valve body may form a main valve biased toward a main valve seat by means of a spring member. The second valve member may be an armature member for receiving a solenoid arrangement. The armature member may be adapted in size and shape to define at least a part of a pilot valve chamber and an inner space fluidly connected to the pilot valve chamber. The armature member may comprise a base portion and an axial portion extending from the base portion in a direction parallel to a longitudinal axis. The base portion and/or the axial portion may be formed as respective substantially cylindrical portion(s). The base portion may be adapted in size and shape to define at least a part of a pilot valve chamber. The axial portion may be adapted in size and shape to define an inner space for enabling an actuating member to axially move therein to interact with the valve arrangement when arranged in the pilot valve chamber. The valve housing member may be adapted to provide a valve seat at a longitudinal outer end of the valve housing member. The longitudinal end of the valve housing member may be adapted to be inserted at least partly into the armature member via an access opening leading into space at least partly defining the pilot valve chamber. The valve housing member may comprise a main fluid flow opening located at the longitudinal outer end of the valve housing member leading into a main valve chamber at least partly defined by the valve housing member. The valve seat may be adapted in size and shape to extend in a circumferential direction around the main fluid flow opening. The main fluid flow opening and/or the valve seat may be arranged in a recessed region at the longitudinal end of the valve housing member. The valve housing member may be adapted in size and shape with a plurality of surface portions extending at least partly and/or wholly in a circumferential direction around the main fluid flow opening but at different radial locations. At least two of the surface portions may be axially offset relative each other to define surfaces at different axial positions. By providing differently axially offset surfaces around the valve seat, one of these may serve as an abutting surface for the valve arrangement and in particular an abutting surface for the first spring member and/or the second spring member.

The first spring member may be adapted to be arranged in a valve chamber of the valve device to be moveable within the valve chamber in an axial direction to interact with the valve seat. The first restriction may be formed between the first spring member and the valve seat. By axially moving the first spring member relative the valve seat, at least partly, the dimensions of the first restriction may be operatively adjusted, thereby enabling regulation of the pressure of hydraulic fluid flow during active control operation. The first spring member may comprise a plurality of first spring member portions adapted to sequentially engage with respective valve seat portions of the valve seat axially offset in the axial direction in response to the actuating force. The respective valve seat portions may be sequentially connected to one another by spring connectors.

The actuating force may be provided by means of an actuating arrangement. The actuating arrangement may comprise an actuating member arranged in the valve device to be operatively moveable to interact with the first spring member. The actuation member may be axially moveable in the valve device. The actuating member may be adapted to interact with the first spring member, thereby subjecting the first spring member to the actuating force. The first spring member may be displaceable relative the valve seat in proportion to a magnitude of the actuating force. The first spring member may be displaceable from a first position, e.g., a non-displaced position, to a second position, e.g., a valve seat position. The first spring member may be adapted to be spring biased in a direction towards the non-displaced position. The actuating force may cause the first spring member to move towards the valve seat position. When the actuating force is characterized by a certain magnitude, the first spring member may be located in the valve seat position where it abuts the valve seat. When the actuating force is no longer present, the first spring member may return towards or be located in the non-displaced position. The first spring member may be adapted to biased in the non-displaced position, i.e., be arranged pre-biased in the valve chamber.

In one exemplary embodiment, the valve housing member is an armature member adapted for securing a solenoid arrangement to the damping device to enable an active control operation of the valve arrangement. Active control operation may be enabled by means of the solenoid arrangement generating a magnetic field variable in field strength and field direction. The actuating member may be forced to move in response the generated magnetic field. By controlling the magnetic field, precise regulation of the pressure of the hydraulic fluid flow is enabled.

The second spring member is adapted to be arranged in the valve chamber to provide a second restriction by which the hydraulic fluid flow is restricted during fail-safe operation. The second restriction may be provided or formed between the second spring member and the valve seat or between the second spring member and the first spring member. The second spring member may be adapted to be arranged pre-biased in the valve chamber. The second spring member may comprise a disc shaped body. The second spring member may comprise a through-hole. The through-hole may be centrally located in the second spring member.

During active control operation, the active control flow channel is open. During fail-safe operation, the active control flow channel is substantially closed by means of the first spring member. The valve arrangement may be adapted so that the first spring member is located in the non-displaced position when it closes the active control flow channel. The control flow channel may be accessed by means of a control flow channel opening. The dimensions of the control flow channel opening may be adjusted by means of the relative displacement of the first spring member to the second spring member. The first spring member may be moveable to a position where it closes the control flow channel.

Upon arranging the valve arrangement in a valve chamber, the first spring member and the second spring member may be arranged so that the active control channel is formed between the first fluid flow space and the second fluid flow space. The first fluid flow space may be fluidly connected to a fluid flow opening in the valve seat. The second fluid flow space may be fluidly connected to a fluid flow reservoir space. Since the second spring member is adapted to be arranged in the valve chamber of a valve device such that it at least partly separates a first fluid flow space and a second fluid flow space within the valve chamber, thereby removing the necessity that the valve device itself defines such a separation structurally.

The active control flow channel provides a channel through which the hydraulic fluid flow primarily flows through during active control operation. By primarily, it may be meant that a majority of the hydraulic fluid flow flows through said active control flow channel during active control operation, for instance more than 50% of the hydraulic fluid flow, preferably at least 60%, 70%, 80%, 90% or 99% or 100% of the hydraulic fluid flow. The active control flow channel may be provided by a gap formed between a boundary of a through-hole provided in the second spring member and an outer surface of an actuating member adapted to move through the through-hole to interact with the first spring member.

According to one embodiment, the valve arrangement is adapted so that during fail-safe operation, the active control flow channel is substantially closed by the first spring member directly engaging with the second spring member. By this, the valve arrangement may be realized in a more compact manner as opposed to an embodiment where these do not engage directly with each other. The first spring member and the second spring member may each comprise a respective contact portion, and the respective contact portions of the first spring member and the second spring member come in contact when then first spring member is moved to close the active control flow channel.

According to one embodiment, the valve arrangement further comprises a closing member arranged between the first spring member and the second spring member so that during fail-safe operation, the active control flow channel is substantially closed by the closing member directly engaging with the second spring member. The closing member may comprise a deformable material suitable for sealing. Thereby, when the first closing member moves to close the active control flow channel, the closing member may seal the channel in a more satisfactory manner. The deformable material may be a rubber material.

According to one embodiment, the second spring member is offset from an inner surface of the valve chamber to form said second fluid flow space by means of one or more spacer elements. By said spacer elements, the second spring member may be maintained at a desirable position so as to ensure adequate flow through dimensions in the second flow space. The said one or more spacer elements may be arranged so as to define one or more respective radial openings for allowing fluid flow through the second fluid flow space. Said or more spacer elements may be generally located at a radial distance from a longitudinal axis and extend circumferentially about said longitudinal axis. The longitudinal axis may be defined by a longitudinal extension of one or more elements of the valve device and/or the valve arrangement. In one exemplary embodiment, at least two spacer elements are provided. In one exemplary embodiment, a set of spacer elements are provided and are symmetrically arranged in a circumferential direction around the longitudinal axis.

According to one embodiment, said one or more spacer elements are provided by the second spring member. By this, the valve device into which the valve arrangement is adapted to be arranged does not require any specific modifications for maintaining the dimensions of the second fluid flow space.

According to one embodiment, said one or more spacer elements are arranged to extend from said inner surface of the valve chamber. By this, the spacer elements may be made of a material different from the second spring member. This may be preferable so as to provide the spacer elements in a more durable material than the second spring member.

According to one embodiment, the first spring member is a shim spring. The first spring member may comprise a central portion and a rim portion. The central portion and the rim portion may be flexibly coupled to one another by means of one or more flexible connecting members. For instance, two, three, four, or more flexible connecting members may be arranged to connect directly or indirectly with the rim portion. The first spring member may comprise an intermediate portion flexibly arranged between the central portion and the rim portion. The intermediate portion may be flexibly coupled to the central portion by means of one or more flexible connecting members. For instance, two, three, four, or more flexible connecting members may be arranged to connect the intermediate portion with the central portion. The rim portion may be flexibly coupled to the intermediate portion by means of one or more flexible connecting members. For instance, two, three, four, or more flexible connecting members may be arranged to connect the rim portion with the intermediate portion. Thereby, the shim spring may be displaced partially with different spring characteristics.

According to one embodiment, the second spring member comprises two or more support members adapted with an inclined geometry relative a major surface of the second spring member so that they extend at least partly away from the first spring member. By this, the second spring member may be limited in terms of flexing displacement during fail-safe mode since the support member may come in contact with inner walls of the valve chamber. As an alternative, or in combination, the second spring member may be adapted to engage with one or more protrusions provided in the valve chamber by which the second spring member is limited in terms of flexing displacement during fail-safe mode. Said two or more support members may be adapted to engage with said one or more protrusions.

According to one embodiment, the second spring member is further adapted with a through-hole through which an actuating rod is adapted to control the interaction between the first spring member and the valve seat, and the second spring member is adapted so that the active control flow channel extends between the actuating rod and a boundary of said through-hole of the second spring member. By this, the active control flow channel is realized in a compact manner which further reduces the space required for the valve arrangement in a valve device.

According to one embodiment, the valve arrangement is adapted to be arranged in a pilot valve chamber of a valve device. The valve arrangement may serve as a portion of, or as, the pilot valve in such a valve device.

According to a second aspect of the disclosure, it is provided a valve device for electrically regulating a pressure in a fluid flow through the valve device in response to an actuating force during a normal operation and mechanically regulating said pressure during a fail-safe operation when no actuating force is present. The valve device comprises: a valve chamber, a valve seat arranged in said valve chamber, and a valve arrangement according to the first aspect of the disclosure or any embodiments or variations thereof. The first spring member of the valve arrangement is arranged in the valve chamber to be moveable within the valve chamber in an axial direction to interact with the valve seat to provide a first restriction by which the hydraulic fluid flow is restricted during active control operation. The second spring member of the valve arrangement is arranged in the valve chamber such that the second spring member with the first spring member provides a second restriction by which the hydraulic fluid flow is restricted during fail safe operation. The second spring member further arranged in the valve chamber to define a first fluid flow space, a second fluid flow space, and an active control flow channel fluidly connecting the first fluid flow space with the second fluid flow space. The valve device is adapted so that during active controlled operation, the active control flow channel is open, and during fail-safe operation, the active control flow channel is substantially closed by means of the first spring member. By incorporating a valve arrangement according to the first aspect or any embodiments thereof, the valve device may be provided in a compact form factor, thereby solving an object of the disclosure.

According to a third aspect of the disclosure, a shock absorber is provided. The shock absorber comprises a valve device according to the second aspect or any variations thereof. The valve device may be configured to be arranged to control damping characteristics during compression and/or rebound of the shock absorber. A shock absorber herein discussed is not limited to any particular type of vehicle and may be comprised in any vehicle.

According to one embodiment, the shock absorber comprises two valve devices according to the second aspect or any variations thereof. One of the two valve devices may be arranged to control damping characteristics during compression of the shock absorber while the other of the two valve devices is arranged to control damping characteristics during rebound of the shock absorber.

According to a fourth aspect of the disclosure, a method is provided of regulating a pressure in a hydraulic fluid flow through a valve device in response to an actuating force during an active control operation and mechanically regulating said pressure during a fail-safe operation when no actuating force is present. The method comprises the steps of: during active control operation, regulating the pressure in the hydraulic fluid flow by means of a first restriction formed between a first spring member and a valve seat, and guiding the hydraulic fluid flow between a first fluid flow space and a second fluid flow space by means of an active control flow channel; when changing from active control operation to fail-safe operation, closing the active control flow channel by means of moving the first spring member into a closing position, and during fail-safe operation, regulating the pressure in the hydraulic fluid flow by means of a second restriction formed between the first spring member and a second spring member.

According to one embodiment, the first spring member is directly engaging the second spring member when the first spring member is in the closing position.

BRIEF DESCRIPTION OF THE DRAWINGS

The disclosure will in the following be described in more detail with reference to the enclosed drawings, wherein.

DESCRIPTION OF EMBODIMENTS

Figure 1:
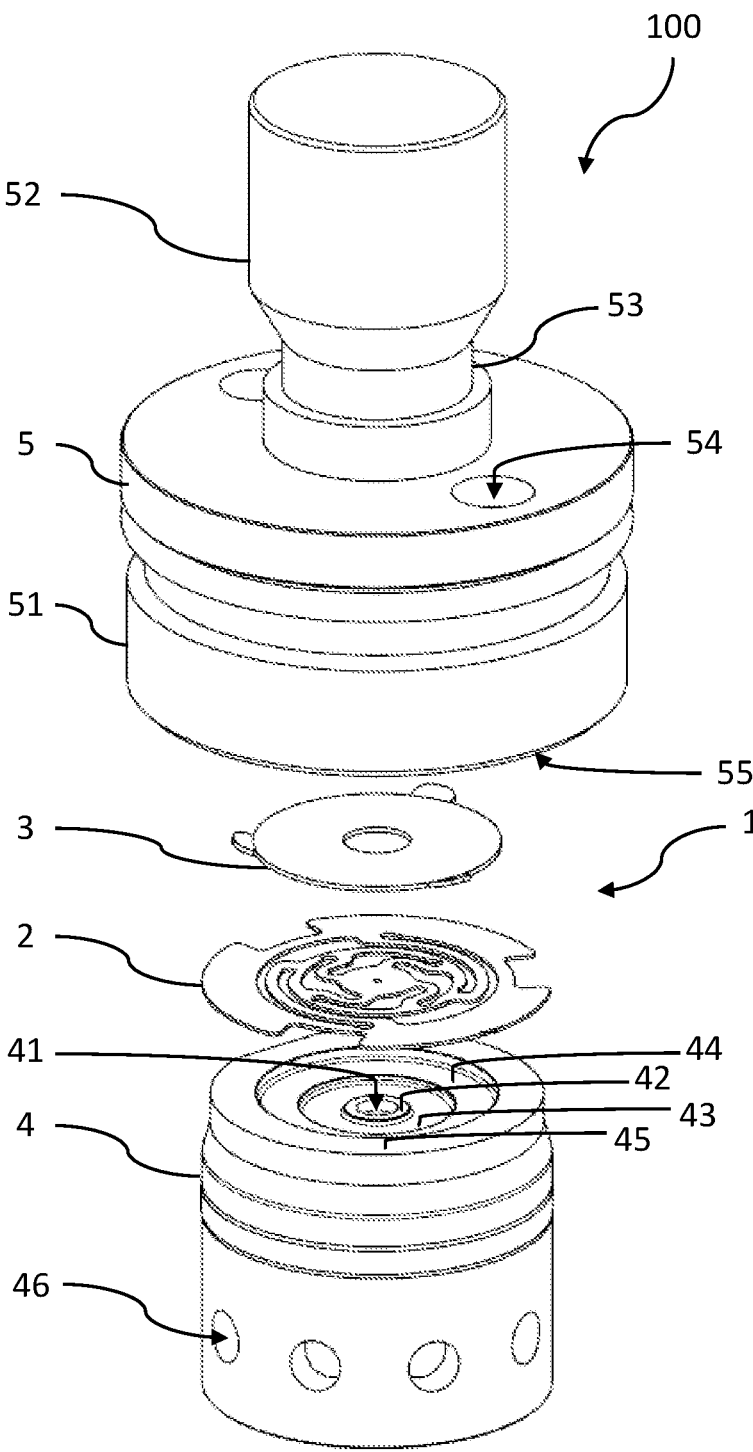
FIG. 1 shows an exploded view of a valve device comprising a valve arrangement according to one embodiment of the disclosure.

The present disclosure will be described more fully hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. In the drawings, like numbers refer to like elements.

FIG. 1 shows an exploded view of a valve device 100 comprising a valve arrangement 1 according to one embodiment of the disclosure. The valve arrangement 1 may be used for regulating a pressure in a hydraulic fluid flow in such a valve device 100 in response to an actuating force during an active control operation and for mechanically regulating said pressure during a fail-safe operation when no actuating force is present. The valve arrangement 1 is adapted to be arranged between a first valve member 4 and a second valve member 5. In the embodiment illustrated in FIG. 1, the first valve member 4 is a valve housing member 4 whereas the second valve member 5 is an armature member 5. The valve housing member 4 and/or the armature member 5 are adapted to define a valve chamber, in particular a pilot valve chamber 50, between them into which the valve arrangement 1 is adapted to be arranged. It should be understood that the valve arrangement 1 is not limited to such exemplary application and may be applicably comprised as a valve arrangement in a main valve.

As illustrated in FIG. 1, the valve housing member 4 comprises a cylindrical body and defines at one longitudinal outer end of the cylindrical body a main fluid flow opening 41. The main fluid flow opening 41 is centrally located at said longitudinal end of the valve housing member 4. The valve housing member 4 further comprises a plurality of radial fluid flow openings 46 leading into an interior space defined by the valve housing member 4. The main fluid flow opening 41 is provided in a recessed region. In the recessed region, around the main fluid flow opening 41, a circumferentially extending portion 42 is provided which is adapted to serve as a valve seat 42. The recessed region is further adapted to provide at least two surface portions 43, 44 offset relative each other in a longitudinal direction of the valve housing member 4. Said at least two surface portions 43, 44 extend in a circumferential direction around the main fluid flow opening 41 at different radial distances. The inner 43 of said at least two surface portions 43, 44 adjacent the valve seat 42 is offset into the valve housing member 4 relative the valve seat 42. One other 44 of the at least two surface portions 43, 44 may be adapted to abut with the valve arrangement 1 when the damping device 100 is assembled, thus serving as an abutting surface portion 44. The valve housing member 4 may further define an outer surface portion 45 extending in a circumferential direction around the main fluid flow opening 41. The abutting surface portion 44 may be axially offset relative the outer surface portion 45 into the valve housing member 4. The abutting surface portion 44 may be axially offset relative the valve seat 42.

The armature member 5 defines a space (not shown in FIG. 1) serving as a at least a portion of, or wholly of, a pilot valve chamber, wherein said space is accessible from an access opening 55 located on a valve housing member arrangement side of the armature member 5. The valve housing member 4 may be adapted to be inserted in said access opening 55 of the armature member 5. In doing so, the valve housing member 4 may couple with the armature member 5. The armature member 5 is further adapted with a base portion 51 and an axial portion 52. The base portion 51 comprises a substantially cylindrical body. The axial portion 52 extends axially from the base portion 51. The axial portion 52 is adapted to engage with a solenoid arrangement (shown in FIG. 4). The armature member 5 further comprises geometrical structures 53, 54 for receiving the solenoid arrangement in a securing manner. The axial portion 52 is adapted with an inner cavity 58 fluidly connected with the space at least partly serving as the valve chamber 50, wherein said inner cavity 58 is adapted to enable an actuating member 56 to axially move therein to interact with the valve arrangement 1.

Figure 2:
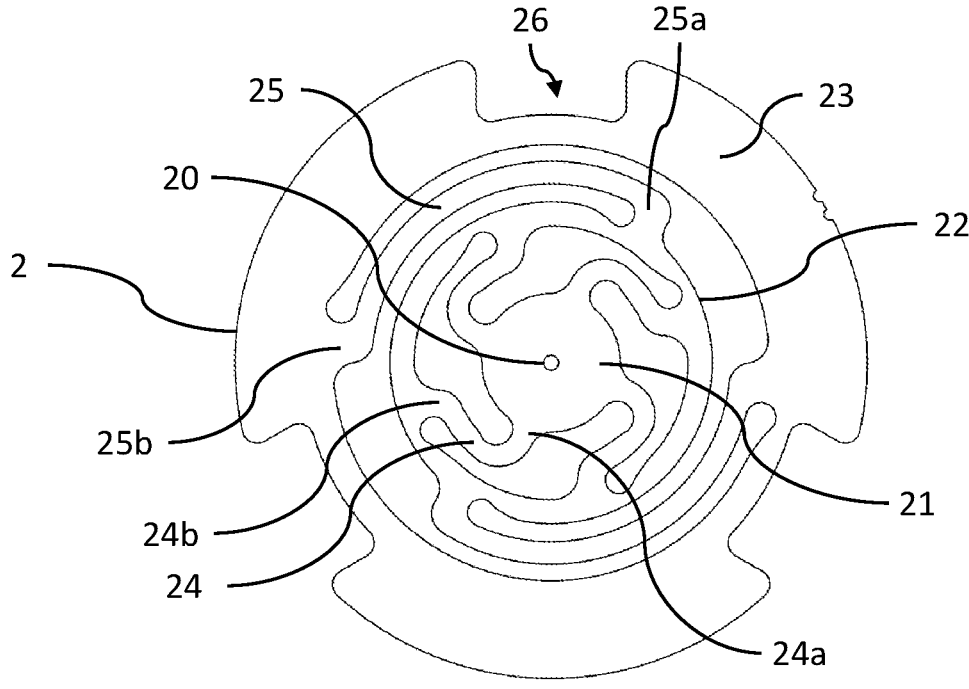
FIG. 2 shows a top view of the first spring member according to one embodiment of the disclosure.
Figure 4:
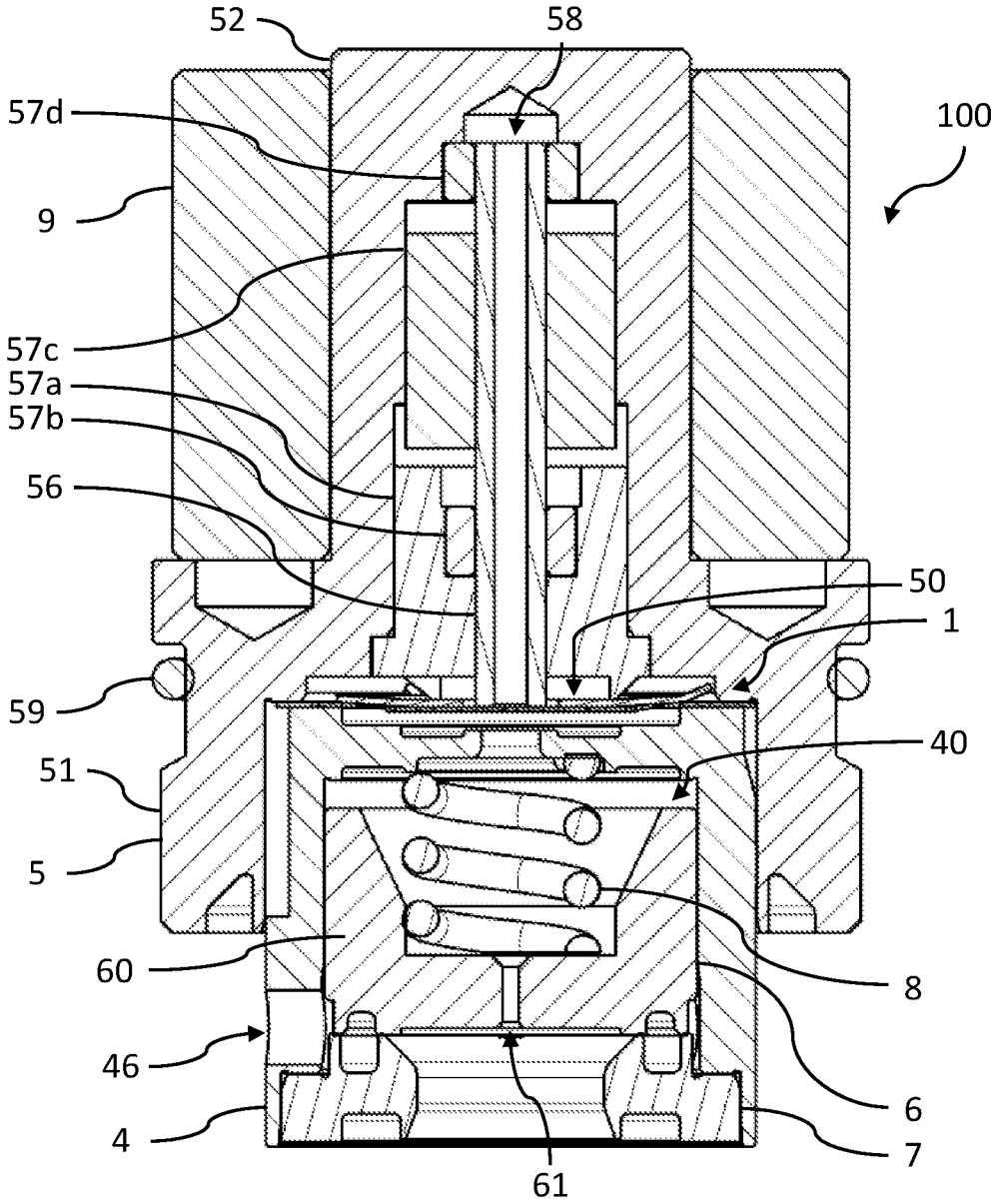
FIG. 4 shows a cross-sectional view of a valve device according to one embodiment of the disclosure.
Figure 5A:
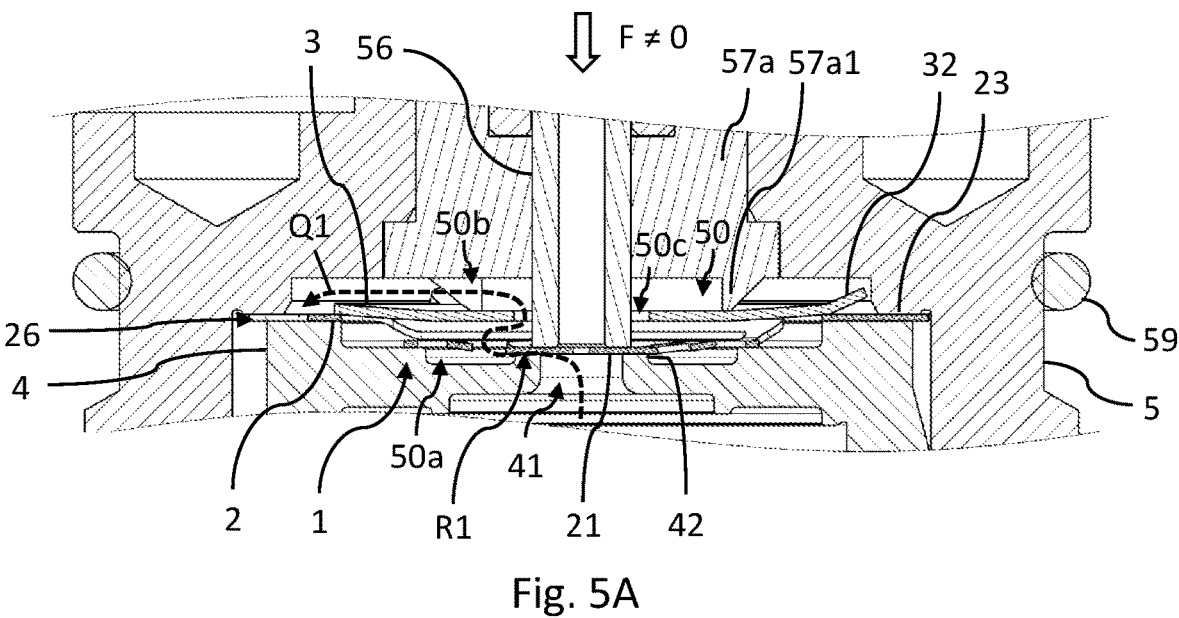
FIGS. 5A-5B show cross-sectional views of a portion of a valve device according to one embodiment of the disclosure during active control operation and during fail-safe operation, respectively.
Figure 5B:
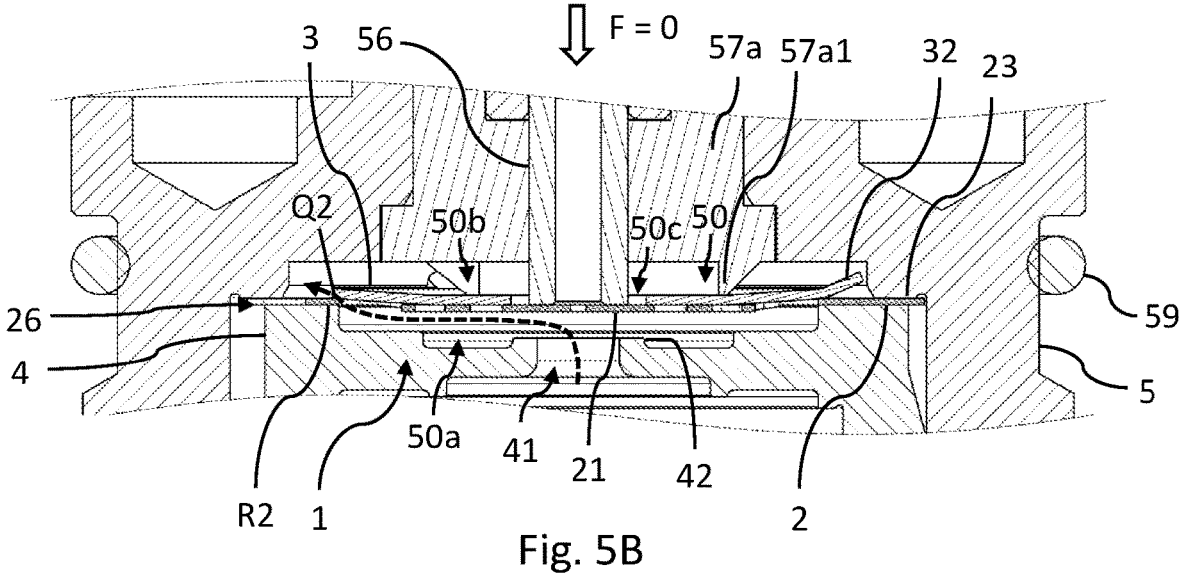

The valve arrangement 1 comprises a first spring member 2. In one exemplary embodiment, as shown in FIG. 2, the first spring member 2 is a shim spring comprising a center portion 21 centrally located in the first spring member 2, an intermediate portion 22 radially located outward from the center portion 21, and a rim portion 23 radially located outward from the intermediate portion 22. The intermediate portion 22 is coupled to the center portion 21 by means of flexible connecting members 24, for instance by means of four such flexible connecting members 24 as shown in FIG. 2. The rim portion 23 is coupled to the intermediate portion 22 by means of flexible connecting members 25, for instance by means of two flexible connecting members 25 as shown in FIG. 2. In the exemplary embodiment depicted in FIG. 2, the flexible connecting members 24, 25 extend at least partly in a circumferential direction. The flexible members 24, 25 may extend radially at least partly at respective connections 24a, 24b, 25a, 25b. As shown in FIGS. 4, 5A, 5B, the first spring member 2 is adapted to be arranged in the valve chamber 50 of the valve device 100 to be at least partly moveable within the valve chamber 50 in an axial direction to interact with the valve seat 41 to provide a first restriction R1 by which the hydraulic fluid flow is restricted during active control operation.

Figure 3:
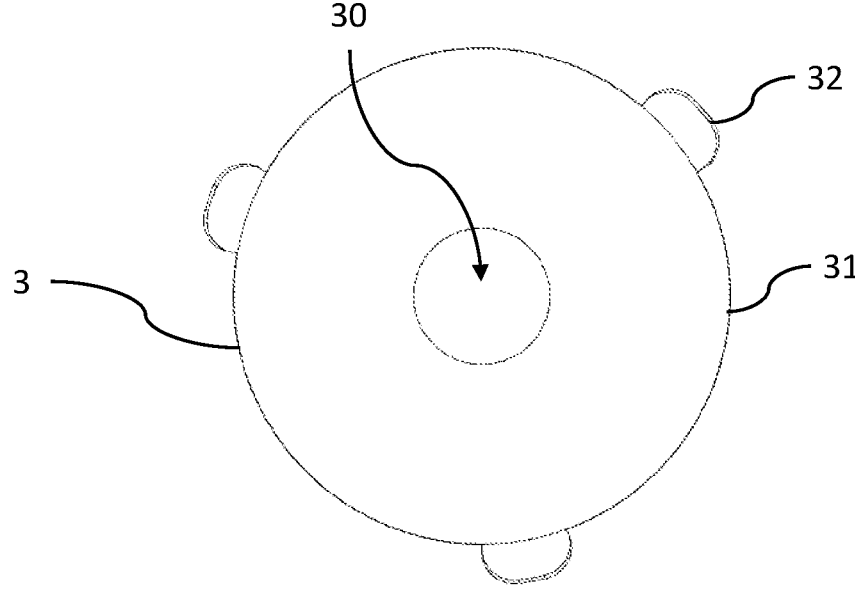
FIG. 3 shows a top view of the second spring member according to one embodiment of the disclosure.

The valve arrangement 1 further comprises a second spring member 3. As shown in FIGS. 1 and 3, the second spring member 3 comprises a substantially disc shaped body 31. A through-hole 30 is located centrally in the disc shaped body 31. The second spring member 3 comprises a plurality of support elements 32 extending outwardly from the edge of the disc shaped body 31. The support elements 32 are provided to extend at an angle relative the disc shaped body. As shown in FIG. 4, 5A, 5B, the second spring member 3 is adapted to be arranged in the pilot valve chamber 50 to provide a second restriction R2 by which the hydraulic fluid flow is restricted during fail-safe operation. The second spring member 3 is further adapted to be arranged in the pilot valve chamber 50 to define a first fluid flow space 50a, and a second fluid flow space 50b. The second spring member 3 is further adapted to be arranged so that an active control flow channel 50c fluidly connects the first fluid flow space 50a with the second fluid flow space 50b.

FIG. 4 shows the valve device 100 according to one embodiment of the disclosure. As previously detailed, the valve device 100 comprises a valve arrangement 1. The valve arrangement 1 is arranged between a valve housing member 4 and an armature member 5. The armature member 5 comprises a base portion 51 and an axial portion 52 extending axially from the base portion 51. The valve device 100 comprises a solenoid arrangement 9 arranged to the armature member 5 so that the axial portion 52 extends at least partly through the solenoid arrangement 9. The axial portion 52 defines an inner space 58 adapted in size and shape for enabling an actuating member 56 to be axially moveable by means of a magnetic field generated by the solenoid arrangement 9. The actuating member 56 is adapted to be axially displaced to interact with the valve arrangement 1.

The valve device 100 further comprises a valve body 6 adapted to be arranged in a valve chamber 40 defined by the valve housing member 4. The valve device 100 further comprises a spring member 8 arranged between the valve body 6 and the valve housing member 4. The valve body 6 further defines a flow channel 61 fluidly connecting a first axial side of the valve body 6 with a second axial side of the valve body 6. The flow channel 61 enables hydraulic fluid flow between the first axial side and the second axial side of the valve body 6. The valve device 100 further comprises a main valve seat member 7 and the valve body 6 is adapted to be axially moveable relative a main valve seat member 7. Fluid flow openings 46 of the valve housing member 4 enables hydraulic fluid flow from the main valve seat member 7 to an outside of the valve housing member 4. In addition, the valve device 100 may further comprise a sealing member 59 for facilitating sealing of a valve cavity into which the valve device 100 is inserted into.

FIGS. 5A and 5B illustrate the working principle of the valve arrangement 1. In the case shown in FIG. 5A, a non-zero actuating force F is applied by means of the actuating member 56 onto the first spring member 2 so that a central portion 21 thereof is axially displaced relative a rim portion 23 secured between the valve housing member 4 and the armature member 5. The central portion 21 of the first spring member 2 is displaced towards a valve seat 42 provided at a longitudinal end of the valve housing member 4. By this, a flow channel 50c formed between the actuating member 56 and the second spring member 3 connects a first fluid flow space 50a with a second fluid flow space 50b separated from each other by means of the second spring member 3. Thereby, a fluid flow Q1 is enabled to flow during active control operation from a fluid flow opening 41 in the valve housing member, through the first restriction R1 formed between the valve seat 42 and the central portion 21 of the first spring member 2, into the first fluid flow space and then into the second fluid flow space 50b via the fluid flow channel 50c. By axially adjusting the position of the actuating member 56, the axial position of the central portion of the first spring member 2 is adjusted as well, which allows for control of the first restriction R1 as well as control over whether the fluid flow channel fluidly connecting the first fluid flow space 50a and the second fluid flow space 50b is open or not. Moreover, the space of the second flow space 50b is maintained by means of spacer elements 57a1 which are arranged in the pilot valve chamber 50.

In the case shown in FIG. 5B, the actuating force F is no longer applied. The first spring member 2, which is biased toward a position where it substantially closes the fluid flow channel 50c. Since no actuating force F is applied, for instance due to a power failure, the first restriction R1 is no longer active. Instead, the fluid flow Q2 is mechanically restricted at a second restriction R2 formed between the first spring member 2 and the second spring member 3. More particularly, the second restriction R2 is formed between an outer edge of the second spring member 3 and the rim portion 23 of the first spring member 2.

Further, in both active control operation and fail-safe mode, fluid flow is able to flow from the second fluid flow space 50b to an outside of the valve housing member 4 via channels provided by gaps 26 in the rim portion 23 of the first spring member 2 enabling access between the valve housing member 4 and the armature member 5.

Figure 6:
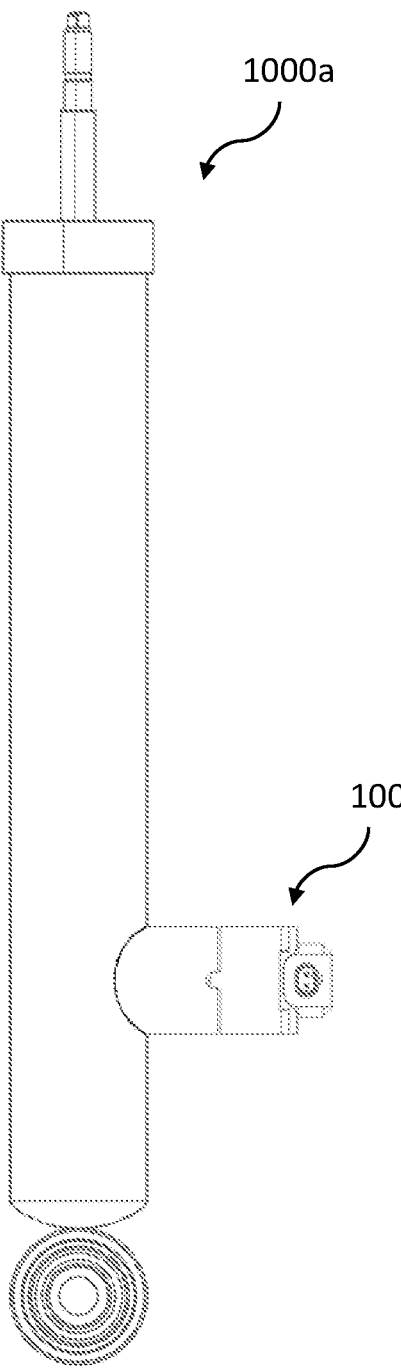
FIG. 6 shows a side view of a shock absorber according to one embodiment of the disclosure.

FIG. 6 show a first embodiment of a shock absorber 1000a comprising the valve device 100. The valve device 100 comprises a valve arrangement 1 according to the disclosure. The valve device 100 may be fluidly connected to a damping chamber of the shock absorber for enabling control of damping characteristics during compression and/or rebound.

Figure 7:
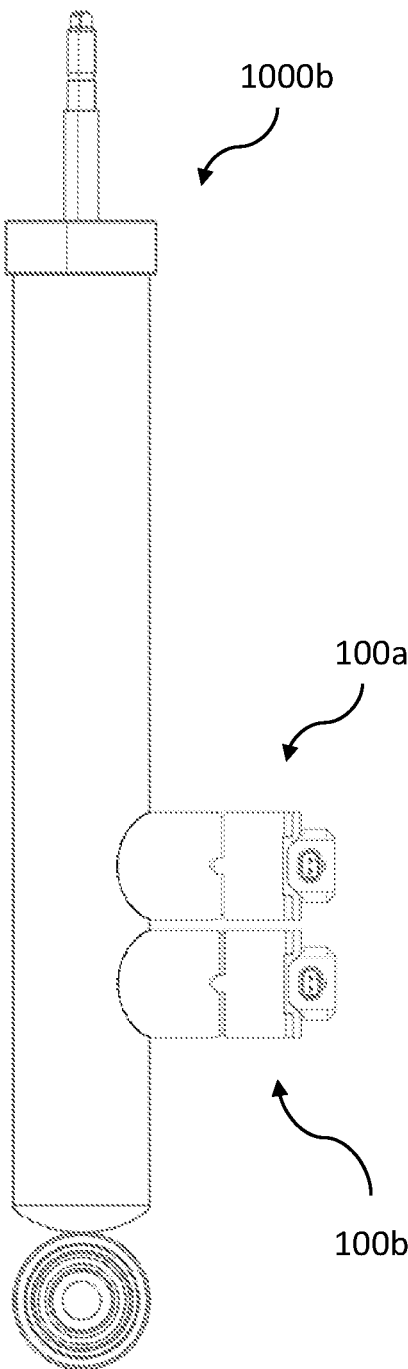
FIG. 7 shows a side view of a shock absorber according to one embodiment of the disclosure.

FIG. 7 show a second embodiment of a shock absorber 1000b comprising two valve devices 100a, 100b. One or both of the valve devices 100 comprises a valve arrangement 1 according to the disclosure. One of the two valve devices 100a, 100b may be fluidly connected to the shock absorber to control damping characteristics during compression and the other of the two valve devices 100a, 100b may be fluidly connected to a damping chamber of the shock absorber for enabling control of damping characteristics during rebound.

Figure 8:
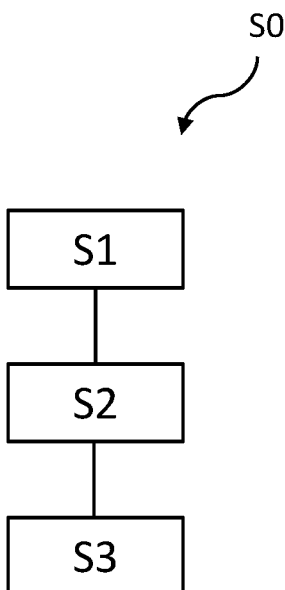
FIG. 8 shows a schematic diagram of a method according to one embodiment of the disclosure.

FIG. 8 illustrate a flow chart diagram of a method of controlling a regulating a pressure in a hydraulic fluid flow according to one embodiment of the disclosure. The method allows regulating a pressure in a hydraulic fluid flow through a valve device 100 in response to an actuating force F during an active control operation and mechanically regulating said pressure during a fail-safe operation when no actuating force F is present. The method S0 comprises the steps of: during active control operation, regulating S1 the pressure in the hydraulic fluid flow by means of a first restriction R1 formed between a first spring member 2 and a valve seat 6, and guiding the hydraulic fluid flow between a first fluid flow space and a second fluid flow space by means of an active control flow channel, and when changing from active control operation to fail-safe operation, closing S2 the active control flow channel by means of moving the first spring member 2 into a closing position, and during fail-safe operation, regulating S3 the pressure in the hydraulic fluid flow by means of a second restriction R2 formed between the first spring member 2 and a second spring member 3. The method S0 may be adapted so that the step S2 of closing the active control flow channel involves directly engaging the second spring member 3 with the first spring member 2 to close the active control flow channel.

In the drawings and specification, there have been disclosed preferred embodiments and examples of the disclosure and, although specific terms are employed, they are used in a generic and descriptive sense only and not for the purpose of limitation, the scope of the disclosure being set forth in the following claims.

The invention claimed is:

1. A valve arrangement for regulating a pressure in a hydraulic fluid flow in a valve device in response to an actuating force during an active control operation and for mechanically regulating said pressure during a fail-safe operation when no actuating force is present, the valve arrangement comprising:

a first spring member adapted to be arranged in a valve chamber of the valve device to be at least partly moveable within the valve chamber in an axial direction to interact with a valve seat to provide a first restriction by which the hydraulic fluid flow is restricted during active control operation, and a second spring member adapted to be arranged in the valve chamber to provide a second restriction by which the hydraulic fluid flow is restricted during fail-safe operation, the second spring member further adapted to be arranged in the valve chamber to define a first fluid flow space and a second fluid flow space, and further adapted to be arranged so that an active control flow channel fluidly connects the first fluid flow space with the second fluid flow space, wherein during active control operation, the active control flow channel is open, and during fail-safe operation, the active control flow channel is substantially closed by the first spring member directly engaging with the second spring member.

2. The valve arrangement according to claim 1, wherein the second spring member is offset from an inner surface of the valve chamber to form said second fluid flow space by one or more spacer elements.

3. The valve arrangement according to claim 2, wherein said one or more spacer elements are provided by the second spring member.

4. The valve arrangement according to claim 2, wherein said one or more spacer elements are arranged to extend from said inner surface of the valve chamber.

5. The valve arrangement according to claim 1, wherein the first spring member is a shim spring.

6. The valve arrangement according to any claim 1, wherein the second spring member comprises two or more support members adapted with an inclined geometry relative a major surface of the second spring member so that they extend at least partly away from the first spring member.

7. The valve arrangement according to claim 1, wherein the second spring member is further adapted with a through-hole through which an actuating member is adapted to control the interaction between the first spring member and the valve seat, and the second spring member is adapted so that the active control flow channel extends between the actuating member and a boundary of said through-hole of the second spring member.

8. The valve arrangement according to claim 1, wherein the valve arrangement is adapted to be arranged in a pilot valve chamber of a valve device.

9. A shock absorber comprising a valve device for electrically regulating a pressure in a hydraulic fluid flow in the valve device in response to an actuating force during a normal operation and mechanically regulating said pressure during a fail-safe operation when no actuating force is present, the valve device comprising:
  a valve chamber;
  a valve seat arranged in said valve chamber;
  a first spring member arranged in the valve chamber to be moveable within the valve chamber in an axial direction to interact with the valve seat to provide a first restriction by which the hydraulic fluid flow is restricted during active control operation; and
  a second spring member arranged in the valve chamber such that the second spring member with the first spring member provides a second restriction by which the hydraulic fluid flow is restricted during fail-safe operation, the second spring member further arranged in the valve chamber to define a first fluid flow space, a second fluid flow space, and an active control flow channel that fluidly connects the first fluid flow space with the second fluid flow space, wherein the second spring member is further adapted with a through-hole through which an actuating member is adapted to control the interaction between the first spring member and the valve seat, and the second spring member is adapted so that the active control flow channel extends between the actuating member and a boundary of said through-hole of the second spring member,
  wherein during active controlled operation, the active control flow channel is open, and during fail-safe operation, the active control flow channel is substantially closed by the first spring member.

10. The shock absorber according to claim 9, comprising two valve devices according to claim 9.

11. The shock absorber according to claim 9, wherein the second spring member is offset from an inner surface of the valve chamber to form said second fluid flow space by one or more spacer elements.

12. The shock absorber according to claim 9, wherein during fail-safe operation, the active control flow channel is substantially closed by the first spring member directly engaging with the second spring member.

13. A method of regulating a pressure in a hydraulic fluid flow in a valve device in response to an actuating force during an active control operation and mechanically regulating said pressure during a fail-safe operation when no actuating force is present, the method comprising the steps of:
  during active control operation, regulating the pressure in the hydraulic fluid flow by a first restriction formed between a first spring member and a valve seat, and guiding the hydraulic fluid flow between a first fluid flow space and a second fluid flow space by an active control flow channel, and
  when changing from active control operation to fail-safe operation, closing the active control flow channel by moving the first spring member into a closing position in which the first spring member is directly engaged with a second spring member, and
  during fail-safe operation, regulating the pressure in the hydraulic fluid flow by a second restriction formed between the first spring member and the second spring member.

14. A valve arrangement for regulating a pressure in a hydraulic fluid flow in a valve device in response to an actuating force during an active control operation and for mechanically regulating said pressure during a fail-safe operation when no actuating force is present, the valve arrangement comprising:
  a first spring member adapted to be arranged in a valve chamber of the valve device to be at least partly moveable within the valve chamber in an axial direction to interact with a valve seat to provide a first restriction by which the hydraulic fluid flow is restricted during active control operation, and
  a second spring member comprising two or more support members adapted with an inclined geometry relative a major surface of the second spring member so that they extend at least partly away from the first spring member, the second spring member adapted to be arranged in the valve chamber to provide a second restriction by which the hydraulic fluid flow is restricted during fail-safe operation, the second spring member further adapted to be arranged in the valve chamber to define a first fluid flow space and a second fluid flow space, and further adapted to be arranged so that an active control flow channel fluidly connects the first fluid flow space with the second fluid flow space,
  wherein during active control operation, the active control flow channel is open, and during fail-safe operation, the active control flow channel is substantially closed by the first spring member.

15. The valve arrangement according to claim 14, wherein the second spring member is further adapted with a through-hole through which an actuating member is adapted to control the interaction between the first spring member and the valve seat, and the second spring member is adapted so that the active control flow channel extends between the actuating member and a boundary of said through-hole of the second spring member.

16. The valve arrangement according to claim 14, wherein during fail-safe operation, the active control flow channel is substantially closed by the first spring member directly engaging with the second spring member.

* * * * *